United States Patent [19]

Fiduccia et al.

[11] Patent Number: 4,896,265
[45] Date of Patent: Jan. 23, 1990

[54] PARALLEL BROADCASTING METHOD AND APPARATUS

[75] Inventors: Charles M. Fiduccia; Richard E. Stearns, both of Schenectady, N.Y.

[73] Assignee: General Electric Company, Schenectady, N.Y.

[21] Appl. No.: 173,913

[22] Filed: Mar. 28, 1988

[51] Int. Cl.[4] ............................................. G06F 15/16
[52] U.S. Cl. ................................. 364/200; 364/229.5; 364/239.0; 364/238.7
[58] Field of Search .............................. 364/200, 900

[56] References Cited

U.S. PATENT DOCUMENTS

| | | | |
|---|---|---|---|
| 4,380,046 | 4/1983 | Frosch | 364/200 |
| 4,523,273 | 6/1985 | Adams et al. | 364/200 |
| 4,598,400 | 7/1986 | Hillis | 370/60 |
| 4,720,780 | 1/1988 | Dolecek | 364/200 |
| 4,739,476 | 4/1988 | Fiduccia | 364/200 |
| 4,740,894 | 4/1988 | Lyon | 364/200 |

Primary Examiner—David Y. Eng
Attorney, Agent, or Firm—John S. Beulick; James C. Davis, Jr.; Paul R. Webb, II

[57] ABSTRACT

Apparatus and method for broadcasting a data word from a row of broadcasting processing elements of a two-dimensional parallel processing system along the columns thereof to other rows of receiving elements in the system is disclosed. The parallel processing system is of the SIMD type, each such element being connected to at least communicate bits to the element adjacent thereto in its column. The sequence of instructions applied to the processing elements is effective to cause the efficient broadcast of the data word, with each processing element turning off upon receiving the complete data word in a shift register therein.

26 Claims, 6 Drawing Sheets

PARALLEL BROADCASTING METHOD AND APPARATUS

The present invention is related in general to methods for solving problems on a parallel processing system and, more specifically, to a method and apparatus for broadcasting data words from selected processing system elements to other elements along a particular system dimension.

BACKGROUND OF THE INVENTION

Parallel processing system as used herein refers to a processing system comprising a plurality of independent, substantially identical, arithmetical-logical processing elements which operate in parallel to perform a multiplicity of processing functions. Each processing element typically comprises memory for storing data upon which to perform instructed operations and to store operational results. The elements are interconnected into an element array that is defined to have a number of dimensions determined by the nature of the interconnections. For example, the plurality of elements may be interconnected into rows and columns to furnish a two-dimensional array. In such a case, the local interconnection between the processing elements enables each element to communicate, i.e. read or write data, with its adjacent row neighbors and adjacent column neighbors. The concept of providing additional interconnections to form an array of three or more dimensions is well known in the art. Thus, in an n-dimensional array, each element would be interconnected to communicate with its adjacent neighbors along each of the n-dimensions.

In one type of parallel processing system known in the art as a single instruction multiple data (SIMD) system, a single sequence of instructions is applied to all processors. That is, all processors simultaneously perform operations in accordance with the same sequence of instructions. In accordance with the overall architecture of such systems, as well known in the art, the sequence of instructions is provided to the array of processing elements by a controller device. The content of this instruction sequence is in turn determined by high level instructions received by the controller from a host computer. It is noted that while the same sequence of instructions is applied to all processing elements, operating flexibility is derived from each element performing instructed operations on different data. Operating flexibility is further realized, as known in the art, by conditioning the execution of instructions by individual processing elements on the state of a value stored in element memory, e.g. a preset flag.

Two-dimensional parallel processing systems have utility for solving a range of computational problem types. For example, problems which include the representation of data in matrix form and the computational manipulation of such matrices are especially well suited for practice on two-dimensional systems. In such a case, each element of a matrix is stored in a different one of the processing elements. Since the two-dimensional processing element array is arranged in rows and columns of processing elements, as are the matrix elements, it is preferable to establish a one-to-one correspondence between the matrix elements and processing elements when storing the matrix elements in the array. That is, the storage of the matrix elements in the processing element array corresponds to a superposition of the matrix over the element array. With respect to problems requiring the multiplication of two matrices or the pivoting of rows and columns, as in linear programming solutions and the Gaussian elimination technique, it may be necessary to broadcast, i.e. communicate, matrix elements stored in the respective processing elements in a row or column of the element array, to the other rows or columns of processing elements storing matrix elements. The purpose of such broadcasting is to provide each processing element with the matrix element values necessary to perform a particular computation. The following matrix multiplication problem is a simple example of the need for such broadcasting. For a matrix $$A = \begin{bmatrix} A1 & A2 \\ A3 & A4 \end{bmatrix}$$

and a matrix $$B = \begin{bmatrix} B1 & B2 \\ B3 & B4 \end{bmatrix},$$

it is desired to determine the elements of a product matrix C where $$C = A \cdot B \qquad (1)$$

Using the outer product method, known in the art, the product $A \cdot B$ may be represented as the matrix multiplications shown in equation (2):

$$C = \begin{bmatrix} A1 \\ A3 \end{bmatrix} \cdot [B1 \ B2] + \begin{bmatrix} A2 \\ A4 \end{bmatrix} \cdot [B3 \ B4] \qquad (2)$$

The result of continuing the matrix multiplication is shown in equation (3):

$$C = \begin{bmatrix} A1 \cdot B1 & A1 \cdot B2 \\ A3 \cdot B1 & A3 \cdot B2 \end{bmatrix} + \begin{bmatrix} A2 \cdot B3 & A2 \cdot B4 \\ A4 \cdot B3 & A4 \cdot B4 \end{bmatrix} \qquad (3)$$

The resultant product matrix is seen in equation (4):

$$C = \begin{bmatrix} A1 \cdot B1 + A2 \cdot B3 & A1 \cdot B2 + A2 \cdot B4 \\ A3 \cdot B1 + A4 \cdot B3 & A3 \cdot B2 + A4 \cdot B4 \end{bmatrix} \qquad (4)$$

Figure 1:
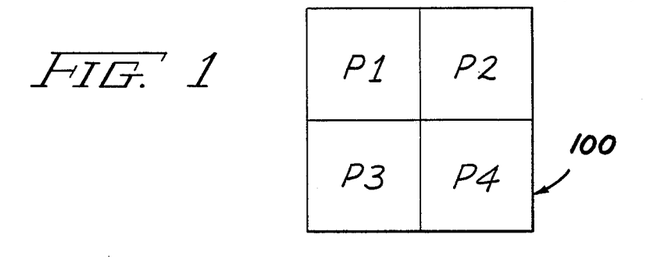
FIG. 1 illustrates a simple parallel processing array with respect to which a matrix multiplication operation is described.

FIG. 1 illustrates a simple 2×2 parallel processing array 100 in which the matrix product may be computed. There, the four processing elements are respectively labelled P1, P2, P3 and P4. In computing the matrix product, the four matrix A elements A1, A2, A3 and A4 would be stored in processing elements P1, P2, P3 and P4, respectively. Similarly, the four matrix B elements B1, B2, B3 and B4 would respectively be stored in processing elements P1, P2, P3 and P4. It is therefore seen that in order to compute the products of matrix elements as illustrated in equation (3), it is necessary to broadcast the element values of the first row [B1, B2] of the B matrix stored in the first row of processing elements [P1, P2] to the second row of processing elements and broadcast the elements of the B matrix second row, stored in the second row of processing elements, to the first processing element row. Similarly, it is necessary to broadcast the elements of the A matrix first column stored in the first column of processing elements [P1, P3] to the second column of processing elements and broadcast the A matrix second column elements to the first column of processing elements. As a result of such broadcasting operations, each processing element receives the matrix element values necessary to perform the computations illustrated in equation (3). For example, element P3 upon storing matrix elements A3 and B1 can compute the product A3·B1 and upon storing elements A4 and B3 can compute the product A4·B3.

As will be recognized by those skilled in the art, such row and column broadcasting would be required for the performance of matrix multiplication in this manner irrespective of the sizes of the matrices being multiplied (subject to the compatibility of the respective matrix dimensions). In general, each row element is broadcast to the processing elements along its respective column and each column element is broadcast to the processing elements along its respective row. Thus, broadcasting occurs along the dimensions of the processing element array, i.e. along rows and columns. Where the matrices being multiplied are large in dimension, such row and column broadcasting can consume substantial computing time. It would therefore be desirable to provide a time efficient method for row and column broadcasting for practice on a two-dimensional parallel processing system.

While the above discussion and example are directed to two-dimensional processing elements and matrices, computations may be performed on processing element arrays of one dimension or three or more dimensions which require the broadcasting by processing elements of a data word to the other processing elements along a particular dimension of the element array. It would therefore be desirable to provide a time efficient method for the broadcasting of data words by selected processing elements in an n-dimensional parallel processing system to the other processing elements along a particular array dimension.

It is therefore a principal object of the present invention to provide a method for efficiently broadcasting a data word from selected elements of an n-dimensional parallel processing system along a predetermined dimension thereof.

SUMMARY OF THE INVENTION

In accordance with the present invention there is provided method and apparatus for broadcasting, on a parallel processing system comprising a plurality of processing elements (PEs) arrayed in n-dimensions, an m-bit data word along a predetermined one of the n-dimensions from each of selected ones of the PEs. In accordance with the present invention, all of the selected PEs broadcast their respective m-bit data words in a like predetermined direction along the predetermined dimension. The processing system is of the single instruction multiple data type in which each successive instruction is applied to all PEs in the processing system. Each PE has a communication buffer coupled to serially communicate data bits at least to the communication buffer of the PE adjacent thereto in the predetermined direction along the predetermined dimension. Each PE also has a p-bit shift register, where p is greater than or equal to m, and a sleep flag which when set results in the PE ignoring instructions applied thereto. The communication of data bits between PEs is unaffected by the value of the sleep flag. The processing system includes a global counter.

The method of the present invention commences with the step of instructing each PE to set a broadcast flag to a first or a second value respectively in accordance with whether the PE is or is not one of the selected PEs. Each PE is then instructed to clear its respective shift register. Next, a current value C of the global counter is set equal to m. It is then determined whether the sleep flag is set in all PEs and, if so, it is determined that the m-bits stored in the shift register of each PE and justified to one end thereof along a first shifting direction constitute the complete data word being broadcast. If it is determined the respective sleep flags of any PEs are not set, then each PE is instructed to shift its shift register 1-bit position in the first shifting direction while storing as the sleep flag a last register bit shifted out and to shift into the shift register as a first register bit, the bit stored in the communication buffer. Following this step, each PE communicates the bit stored in its communication buffer to the communication buffer of the PE adjacent thereto in the predetermined direction along the predetermined dimension. Next, a determination is made as to whether the global counter has the value '0', and, if so, returning to the step in which the condition of the sleep flags is determined. If the global counter does not have the value '0', then each PE is instructed to store the $C^{th}$ bit of the data word in its communication buffer only if its broadcast flag is set, i.e. this operation is only performed by broadcasting PEs. As final steps, the global counter is decremented and the method returns to the sleep flags condition determining step.

In accordance with an illustrated embodiment described hereinbelow, each PE includes a random access memory. With memory so provided in each PE, each m-bit data word is initially stored in the memories of the respective selected PEs from which the data words are to be broadcast. As is noted hereinbelow, the invention may also be practiced with the global counter being initialized with a value '1' and incremented, rather than decremented, until reaching the value m.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

DESCRIPTION OF THE INVENTION

Figure 2:
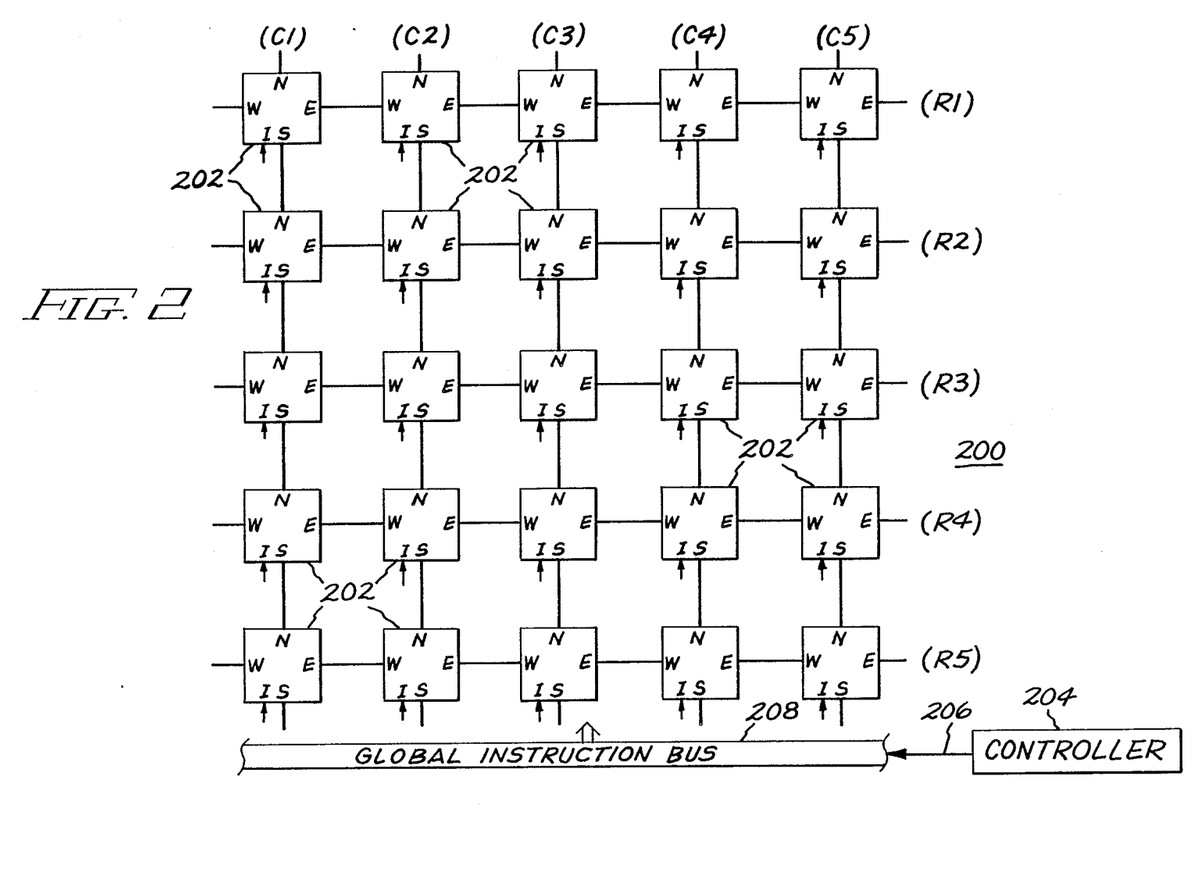
FIG. 2 illustrates a parallel processing system on which the method of the present invention may be practiced.

The present invention is directed to a method and apparatus for efficiently broadcasting a data word from selected elements of an n-dimensional parallel processing system along a predetermined dimension thereof. In the embodiment illustrated and described hereinbelow, the method of the present invention is described with respect to its practice on a two-dimensional parallel processing system. Referring now to the drawings, FIG. 2 illustrates a parallel processing system 200 on which the method of the present invention may be practiced. Processing system 200 comprises a plurality of substantially identical arithmetical-logical processing elements 202 which are interconnected in a two-dimensional array of rows and columns consisting of five rows and five columns. In practice, of course, such an array would comprise a substantially greater number of processing elements, e.g. $512 \times 512$ or more. The five rows and columns illustrated in FIG. 2 are respectively numbered R1 through R5 and C1 through C5 for convenience of description. System 200 is of the above described SIMD type and further includes a controller 204 which performs the functions, among other things, of receiving high level instructions from a host computer (not shown) and providing in response thereto the sequence of instructions to be applied to the individual processing elements 202. The instruction sequence is diagrammatically represented as being provided on a controller output 206 which is coupled to a global instruction bus 208. Bus 208 is in turn coupled to an input "I" of each processing element (PE) so that each instruction in the instruction sequence is simultaneously applied to all elements in system 200. Each element 202 is interconnected to its north (N), south (S), east (E) and west (W) neighbors via bidirectional ports respectively labelled N, S, E and W. The terms north, south, east and west are used in a relative sense herein and not in any absolute sense. The peripheral elements of the array, i.e. columns C1 or C5 or Rows R1 or R5, may be connected to interface apparatus, not shown, for shifting data into or out of the array of processing elements. In the alternative and as described below, the PE array may be wrapped around such that the respective elements of row R1 are interconnected with the respective elements of row R5 and the respective elements of column C1 are interconnected with the respective elements of column C5. As a result of such wrapping around, each individual column and each individual row would constitute a closed loop of PEs.

Figure 3:
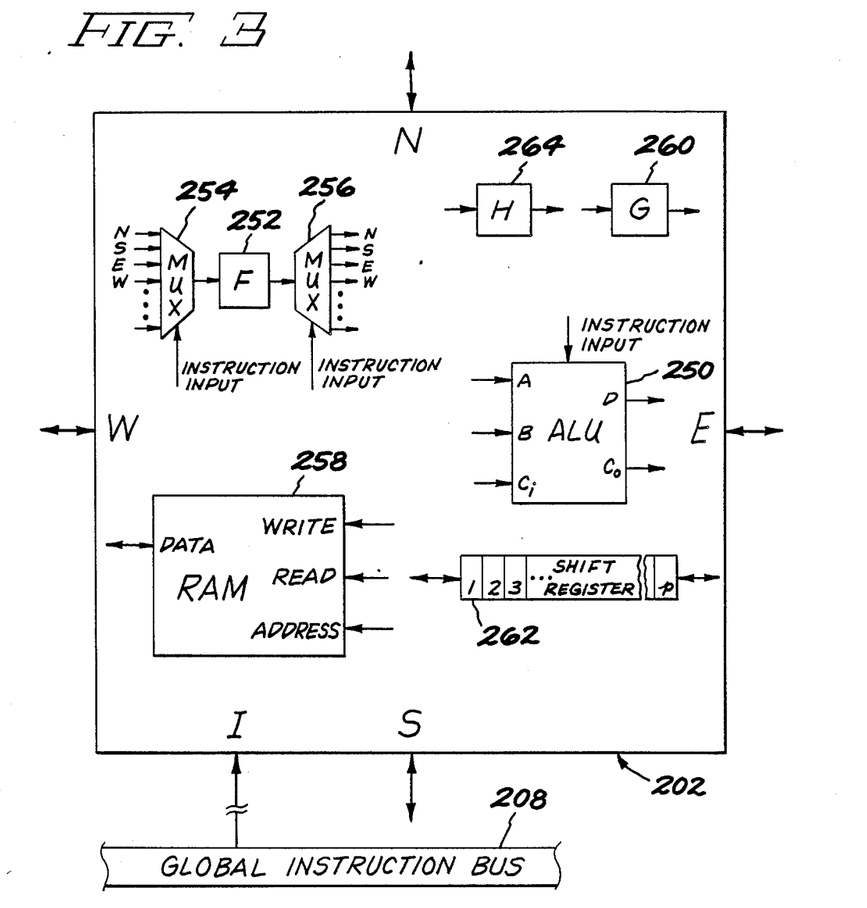
FIG. 3 diagrammatically illustrates the structure of one processing element of the processing system illustrated in FIG. 2.

FIG. 3 illustrates one PE 202 in sufficient detail to show those features necessary to the practice of the present invention. It is understood that each PE may comprise additional features for performing functions not germane to the practice of the present invention. Element 202 comprises an arithmetic-logic unit (ALU) 250 which is diagrammatically illustrated as having A and B operand inputs and a D output as well as a carry-in input $C_i$ and a carry-out output $C_o$. The PE further comprises a one bit communication buffer 252 labelled F which is coupled through a multiplexer 254 to receive the bit applied to the N, S, E or W port of the element. The additional inputs to multiplexer 254 represent the ability to apply thereto bits stored in other components within the PE. The communication buffer is further coupled to apply its contents to a multiplexer 256 the outputs of which are connected to the N, S, E and W element ports as well as to other components within the PE. As can be seen, each multiplexer 254,256 is coupled to receive bits within the instruction applied to the PE in accordance with which an input on multiplexer 254 and an output on multiplexer 256 are selected. Since each PE receives the same instruction, the instruction bits applied to multiplexers 254 and 256 can be effective to connect together the respective communication buffers in each row or in each column. For example, if the N and S connections of multiplexers 254 and 256, respectively, are selected, each PE will be connected to communicate the bit stored in its communication buffer to the buffer of the adjacent element to the south thereof. Each buffer 252 may comprise a 1-bit register. The clock input of the register, as well as of other components of the PE, is not shown, it being understood that application of a clock signal is required to shift a bit into each such component.

The PE additionally includes a random access memory (RAM) 258 which includes read, write, address and data ports. The read, write and address ports are coupled to receive bits of the applied instruction. The data port is connectable, by means not shown, e.g. a multiplexer or crossbar, to other components of the PE. PE 202 also includes a sleep flag 260 which is illustrated as a 1-bit register G. With the sleep flag set, i.e. with a bit value of "1" stored therein, the PE in general ignores the instructions applied thereto. However, the sleep flag status has no effect on communication between the PEs. That is, irrespective of the sleep flag value, connections can be made to the communication buffer and bits can be shifted into and out of that buffer. The use of sleep flags in this manner is known in the art.

Each PE also includes a shift register 262 which is p-bits in length, where p is greater than or equal to the number of bits in an m-bit data word to be broadcast. As in the case of the other PE components, the first and last bits of the shift register are connectable to other components within the PE by means not shown. The PE also includes a broadcast flag 264 which is illustrated as a 1-bit register H. The broadcast flag could as well be provided as a bit position in the RAM. The broadcast flag is set, i.e. has the value "1", in each broadcasting PE which is broadcasting its value of the m-bit data word. Thus, the broadcast flag has the value "0" in each receiving element which is receiving the broadcasted word. It is noted that if the sleep flag of an element is set throughout the broadcast process, the value of its broadcast flag is irrelevant.

Figure 4:
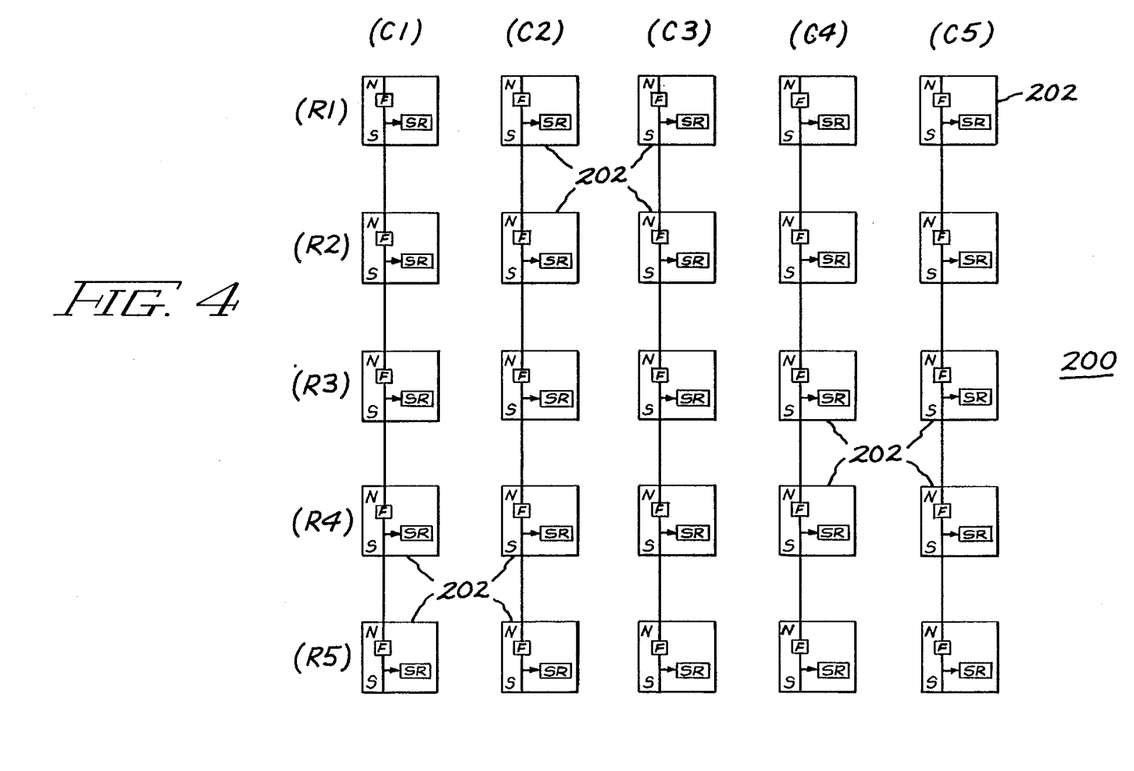
FIG. 4 illustrates for the processing system of FIG. 2 an interconnection of processing elements suitable for enabling a row broadcasting operation in accordance with the method of the present invention.

FIG. 4 illustrates the PEs of system 200 configured to broadcast an m-bit data word from each element in row R1 to the remaining rows in the system. The communication buffer of each PE is connected to the buffers of the PEs adjacent thereto in its respective column to enable communication of data bits therebetween. The E and W connections of each PE are omitted for clarity. Also for clarity, only the communication buffer (F) and shift register (SR) are shown in each PE. In the course of practicing the broadcasting method of the present invention, the data word as received at each PE is shifted into the left end of the shift register, this flow of data being diagrammatically illustrated in FIG. 4 by an arrow extending from the buffer-to-buffer connection to the shift register left end.

Figure 5:
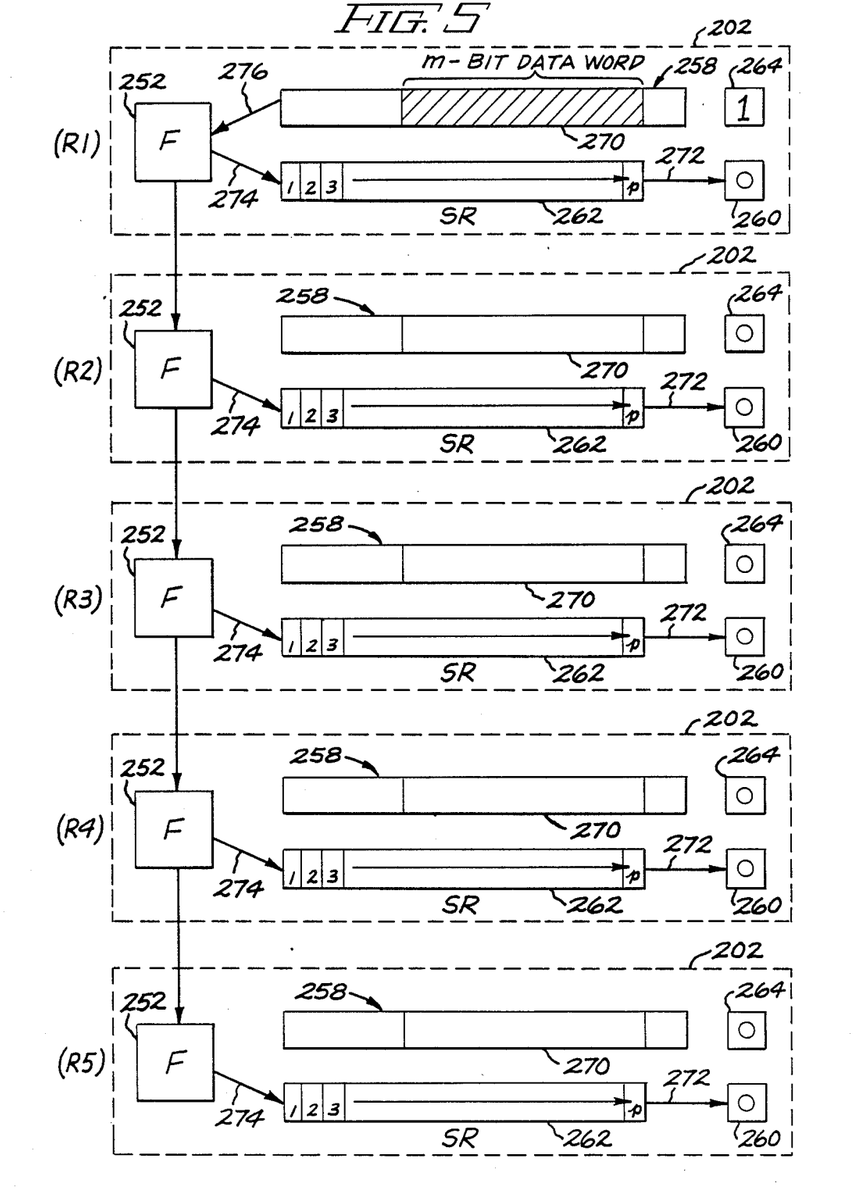
FIG. 5 illustrates a single column of the processing elements illustrated in FIGS. 2 and 4 with respect to which the exemplary row broadcasting operation is described in detail.

FIG. 5 illustrates a single, exemplary column of the processing system with respect to which the operation of the inventive method will be explained. It is understood that the same operations simultaneously occur in columns C1 through C5 as are illustrated and described with respect to the column shown in FIG. 5. Within each PE 202 there is shown sleep flag 260, broadcast flag 264, shift register 262, communication buffer 252 and a portion 270 of RAM 258 which is allocated for the m-bit data word. The PE in row R1 is the broadcasting PE and so portion 270 of RAM 258 is cross-hatched to indicate that the word to be broadcast is initially present in the memory of that element. The respective communication buffers of the PEs are interconnected as illustrated in FIG. 4, such interconnection being maintained by the successively applied instructions. FIG. 5 illustrates an initial state of the PEs, so that sleep flag 260 is indicated as unset, i.e. set to '0', in each element since all elements in FIG. 5 are participating in the broadcast.

Figure 6A:
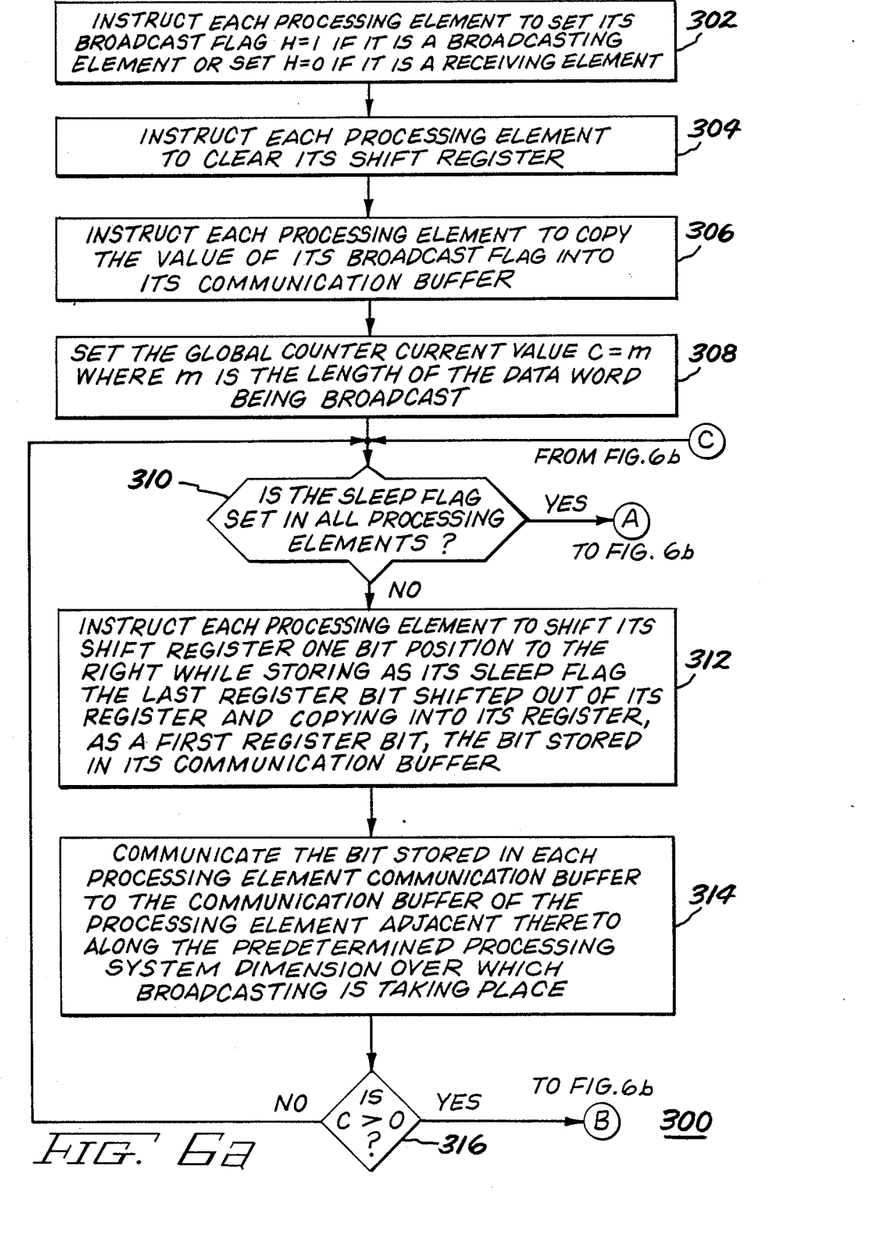
FIGS. 6a and 6b illustrate an embodiment of the method of the present invention in flowchart form.
Figure 6B:
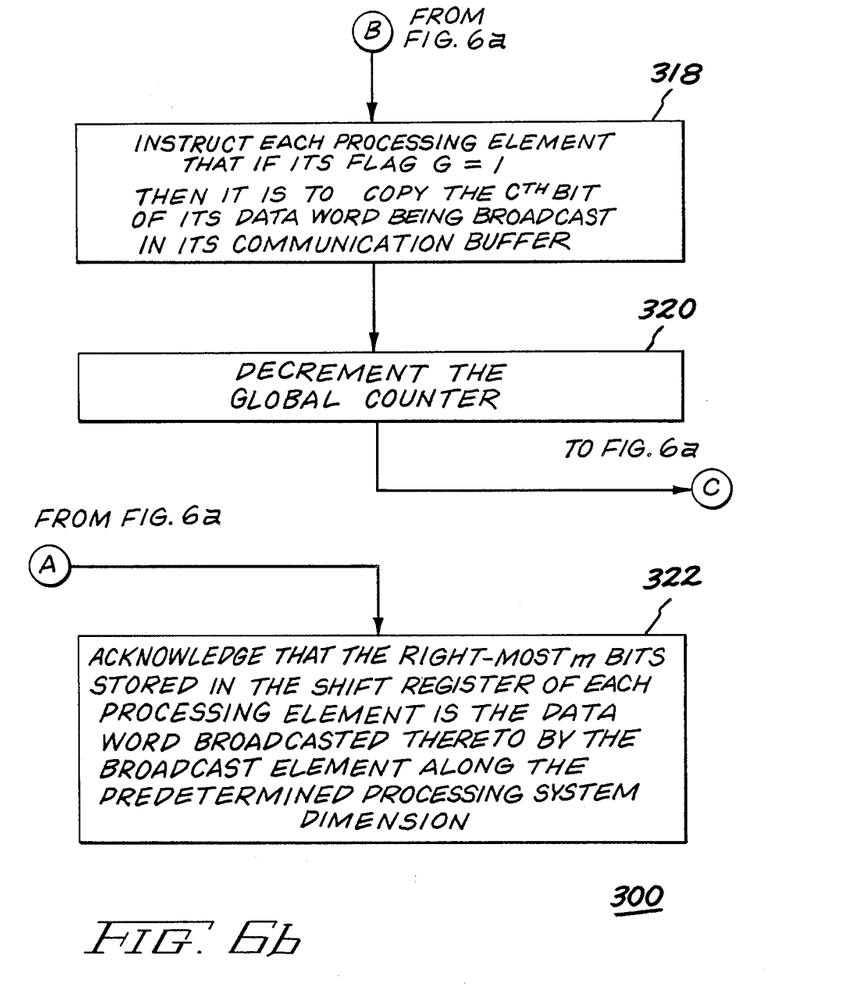

FIGS. 6a and 6b illustrate a flowchart 300 which illustrates the steps of the inventive method as practiced in the illustrated embodiment. It is noted that only those PEs in which the sleep flag is not set will respond even to the initial instruction applied to the processing system in accordance with the inventive method. It is therefore implicit that in accordance with prior programming, the system user has assured that the sleep flag is initially unset in those PEs which are desired to participate in the broadcast. Thus in the illustrated embodiment, the sleep flag is initially unset in the twenty-five PEs forming rows R1 through R5 and columns C1 through C5. Further and as is known in the art with respect to the programming of distributed processing systems, an additional context flag, not shown, may be set in those PEs participating in the broadcast. Such a flag serves as a convenient index for subsequent use, having a utility described below, in identifying the participating elements only. Such context flags are typically stacked in the memory, e.g. RAM 258, of each PE with the bit value at the top of the stack being associated with the current operation, e.g. the broadcast operation, being performed in the processing system. Thus, the stacked context flags represent a nesting of statuses of each PE as respectively associated with a sequence of different programming operations.

Referring again to FIG. 6a, the flowchart commences with a step 302 in which each PE is instructed to set its broadcast flag 264 to the value "1" if it is a broadcasting element or to "0" if it is a nonbroadcasting, i.e. receiving, element. This step may be accomplished by a simple reference by each PE to a predetermined address location in RAM where a previously stored bit serves to identify the function of the particular element. Alternatively, additional operations may be performed requiring each PE to check its row number within the array and determine therefrom whether it is a broadcasting element. The result of performing this step is illustrated in FIG. 5 in which broadcast flag 264 is set to "1" in the row R1 element and to "0" in the other row elements. Referring again to FIG. 6a, proceeding to step 304, all PEs are instructed to clear their respective shift registers 262 so that each such shift register stores only '0' bits. Then at step 306, each PE is instructed to copy the value of its respective broadcast flag into its communication buffer 252. As a result, the row R1 element will copy a "1" bit into its buffer 252 while the elements in the remaining rows copy "0". As will be seen in the ensuing steps, the "1" in the row R1 element buffer 252 will be propagated to all the receiving elements and will serve as an indicator for each receiving element in turn that it has received the complete data word being broadcast. Next, at step 308, a current value C of a global counter is set equal to m, the number of bits, i.e. length, in the data word being broadcast. The global counter maintains count for all PEs and is preferably maintained within system controller 204 (FIG. 2).

Still referring to FIG. 6a, at step 310 it is determined whether the sleep flag is set in all PEs in the processing system, even including those elements which may not be participating in the broadcast. This determination is made because, as will be described hereinbelow, both broadcasting and receiving PEs set their respective sleep flags upon receiving the complete m-bit data word. Thus, the effect of determining if all the sleep flags are set is actually a determination of whether the broadcast is complete. This determination is represented in flowchart 300 by step 322 which is proceeded to from step 310 if the sleep flag is in fact found set in all elements. The determination required by step 310 can be performed by providing logic means such as a global AND gate, e.g. within controller 204, which is coupled to receive the status of the respective sleep flags of all PEs in the system. Thus, where logic means such as the AND gate is employed to perform the step 310 determination, the method would proceed to step 322 upon that logic means determining the respective sleep flags of all the PEs are set. Alternatively, the system user can compute in advance the number of times that selected steps of the broadcasting method must be performed in order to broadcast the data word to all receiving PEs. Thus, a second global counter can be provided with a current value D which is initialized at 0. The counter would preferably be incremented (step not shown) upon each completion of step 314. Step 310 would therefore constitute checking the value D of the second counter against the precomputed required number and upon reading that number, determining that the sleep flag is set in all PEs and, therefore, that the data word has been received by all receiving PEs. Next, at step 312 all PEs are instructed to shift their respective shift registers 1-bit position to the right while storing as the sleep flag value the right-most bit just shifted out and also shifting in as the left-most bit, the bit stored in the communication buffer. Referring to FIG. 5, the operation of shifting the right-most shift register bit into the sleep flag is illustrated by an arrow 272 while the shifting into the shift register of the communication buffer bit is illustrated by an arrow 274.

Referring again to FIG. 6a, the flowchart continues with step 314 in which each PE, irrespective of the condition of its sleep flag, communicates the bits stored in its communication buffer to the communication buffer of the PE adjacent thereto along the predetermined dimension, of the processing system, over which the broadcast is occurring. With respect to the exemplary broadcast, the predetermined dimension is along the columns of the element array. Thus, in FIG. 5 the row R1 PE communicates its buffer 252 bit to the row R2 element in the same column, the row R2 element communicates its buffer 252 bit to the row R3 element, etc., these communications and the direction of bit flow being represented by the buffer-to-buffer interconnections shown in FIG. 5. It is noted that, in general, there are two possible directions of bit communication, and hence data word broadcast, along the predetermined dimension of the element array. Thus, in order to fully define the bit communication, and data word broadcast, it is necessary to also specify in which of the two possible directions the system user has predetermined the broadcast is to occur along the predetermined dimension. In the exemplary two-dimensional system, the predetermined direction and dimension are south along the column dimension.

In step 316 (FIG. 6a), the value of the global counter is tested to determine if it has reached '0'. If it has, this would indicate that each broadcasting PE has stored the last bit of the broadcasted data word into its respective communication buffer (in accordance with step 318 described hereinbelow). In such a case, the flowchart returns to step 310 with the result that the flowchart continues to loop through steps 310 through 316 until all the PE sleep flags are set (step 310). The looping through steps 310 through 316 serves the purpose of communicating the data word bits to the receiving PEs and, via step 312, shifting those bits into the respective shift registers of the receiving PEs. If the global counter current value C is determined to be greater than 0 at step 316, the flowchart, continuing on FIG. 6b, proceeds to step 318 the performance of which is limited to PEs in which the broadcast flag is set. Thus, the instruction applied to the PE would require the PE to test the value of its broadcast flag, e.g. a simple logic test performed by ALU 250, and perform the operation required by step 318 only if it determines the value of its broadcast flag is '1'. In accordance with step 318, each broadcasting PE stores in its communication buffer 252 the $C^{th}$ bit of the data word it is broadcasting, where C is the current value of the global counter. As noted above, the data word is stored in RAM 258, so that this step requires the transfer of the $C^{th}$ bit from RAM 258 to buffer 252.

Referring again to FIG. 5, in the exemplary broadcast the storage operation of step 318 is represented by an arrow 276 extending from RAM 258 to communication buffer 252 in the row R1 PE. Referring again to FIG. 6b, step 320 is next performed in which the current value of the global counter is decremented. As can be seen, as a result of the counter decrementing following step 318, each successive performance of step 318 will cause storage in the communication buffer of the next bit of the data word being broadcast. In this manner, all bits of the data word are stored, in sequence from the $m^{th}$ bit to the $1^{st}$ bit, in the communication buffer of each broadcasting PE for communication to the receiving PEs. Further, since the global counter is decremented after performance of step 318, that counter will acquire the value 0 after the final ($1^{st}$) bit of the data word is stored in the communication buffer. Then since, the flowchart returns to step 310, following step 320, on the subsequent performance of step 316 the flowchart will no longer proceed to steps 318 and 320 but will, rather, loop through steps 310 through 316 as described above.

As noted above, the loop through steps 310 through 316 is exited upon the determination at step 310 that all sleep flags are set. The sleep flag is set in each broadcasting and receiving PE upon the particular PE storing the data word in its shift register in the full right justified position. This result is achieved by the initial copying into each broadcasting PE communication buffer of that processing element's broadcast flag value (step 306), i.e. '1'. This '1' bit from each broadcasting PE is communicated, in turn, to the respective communication buffers of the receiving PEs along the predetermined broadcasting dimension, by operation of step 314, and shifted into and along the shift register of each receiving PE by operation of step 312. Since all PE shift registers are initially cleared (step 304), and since, by operation of step 312, the right most bit shifted out of the shift register is shifted into the sleep flag, the first nonzero bit to be shifted into the sleep flag, thereby setting the sleep flag, is the '1' bit originated from the broadcasting PE. Since by operation of the inventive method in accordance with flowchart 300, the bits of the data word are inserted into each broadcasting PE communication buffer in sequence following the copy of the broadcast flag value, each receiving PE's sleep flag is set when the data word has been shifted to the right justified position. It is noted that where the data word size and shift register are of equal length, the data word when completely received in each shift register will actually occupy the entire shift register rather than merely occupying a right justified position. It is further noted that the copying by receiving PEs of their broadcast flag values, i.e. '0', into their respective buffers 252 (step 306), assures the presence of '0's in their communication buffers prior to the initial performance of step 314 so that their is no possibility of other '1' bits preceding the receipt of the broadcasting PE '1' bits in the communication buffers.

It is additionally noted that all PEs including the broadcasting PEs perform step 312, so that each broadcasting PE shifts into its own shift register the copy of the broadcast flag followed by the data word it is broadcasting. As a result, the sleep flag in each broadcasting PE will be set by the copied broadcast flag bit after it has stored the final ($1^{st}$) bit of the data word in its communication buffer. In accordance with the effect of the sleep flag when set, as described hereinabove, once the sleep flag is set in each broadcasting or receiving PE, that PE no longer responds to the instruction(s) corresponding to step 312 and therefore no longer shifts its shift register. It is also noted that each broadcasting PE upon setting its sleep flag no longer responds to the instruction(s) corresponding to step 318.

As indicated above, the flowchart proceeds to step 322 upon the determination at step 310 that all sleep flags are set. Step 322 which actually requires no specific operation simply represents an acknowledgement that the right-most m bits stored in the shift register of each PE, whether broadcasting or receiving, is the data word broadcasted thereto by the broadcasting element along the predetermined dimension of the processing system.

Beyond the immediate scope of the present invention, a step following step 322 could comprise shifting the broadcasted data word from shift register 262 into RAM 258. In accordance with the example of matrix multiplication provided hereinabove, such storage in RAM 258 would fulfill the need to access the data word as well as other data words for subsequent computations. It is noted that if all PEs are instructed to store the data word into portion 270 of the RAM, this will have the effect, in the case of the broadcasting PEs, of simply overwriting the data word onto itself. With respect to the operation of shifting the data word from the shift register to the RAM, and in consideration of the fact that the inventive algorithm is for practice on a SIMD type system, it would be necessary to limit the performance of this operation to those PEs that participated in the broadcast. While all PEs in exemplary parallel processing system 200 participated, in the larger systems such as would be encountered in actual practice, it is likely that less than all PEs would participate in the broadcast. The value of the above described context flag would serve as an appropriate test condition for limiting the performance of the RAM storage operation to those PEs having the appropriate value of that flag.

While in the exemplary broadcasting operation illustrated and described hereinabove broadcasting elements comprise a first row broadcasting to all remaining element rows in one direction along the column dimension, the invention is not so limited. In a two-dimensional system, any row (or column) can contain the broadcasting elements. For example referring again to FIGS. 2 and 4, row R3 could, instead of row R1, comprise the broadcasting elements. In such a case, if the array of PEs in wrapped around in the manner described above, then performance of the inventive method in accordance with flowchart 300 will be effective to, in each column, broadcast the data word to the elements along the column dimension in rows R4, R5, R1 and R2. It is noted that the direction of broadcast from row R3 could be in the direction opposite to that illustrated above such that, each row R3 element communicates bits to its adjacent row R2 element, the row R2 element communicate bits to the adjacent row R1 element, the row R1 element communicates bits to the adjacent row R5 element (due to the wrap around), etc. It is further noted that given such a wrap around configuration, each broadcasting element would not be adversely affected by the bits it receives in its communication buffer from the element adjacent thereto from the direction opposite the broadcast direction. This is because, since step 318 is performed after step 314, each such bit so received would be overwritten in step 318 by the bit of the data word being broadcasted. Again with respect to broadcasting from an intermediate row such as row R3, if the array is not wrapped around, then in order to broadcast to rows (or columns) on both sides of the broadcasting row (or column), two performances of flowchart 300 would be required. The two performances of the flowchart would respectively cause broadcast in the two possible directions along the predetermined broadcast dimension.

While in accordance with the description and drawings herein, with respect to two-dimensional systems, broadcast occurs from elements in a single row or column, the invention is not so limited. The inventive method is equally effective to cause the simultaneous broadcast of data words from multiple broadcasting rows or columns, provided the data words being broadcast from the respective broadcasting rows or columns are all of the same bit length. Thus for example, with respect to processing system 200 as illustrated in FIGS. 2 and 4, simultaneous broadcast can occur from row R1 to row R2 and from row R3 to rows R4 and R5.

While in accordance with the description and drawings hereinabove, the broadcasting elements constitute a single row or column in the two-dimensional element array or, by analogy, lie in a common plane in a three-dimension array or have analogous commonality in an n-dimensional array, the invention is not so limited. The broadcasting elements may comprise any elements in the array, i.e. not necessarily with any commonality, selected by the system user in accordance with the requirements of the computation being performed.

As indicated above, while the invention is illustrated and described for a two-dimensional array of PEs, it may be practiced with equal effectiveness on any element array of n dimensions, where n may range from 1 to any integral value found to have utility. For example in the case of the three-dimensional array, the broadcasting elements may constitute a plane of elements in the array. As described for two-dimensional arrays, n-dimensional arrays may be wrapped around as well. Irrespective of the number of dimensions of an array, there are still only two directions along each such dimension, so that where the array is not wrapped around, it may be necessary to perform the inventive method twice to achieve broadcasting in both directions along a predetermined dimension of the n-dimensional array.

While the method of the present invention has been described and illustrated in flowchart 300 as initially setting the current value of the global counter, at step 308, equal to the data word bit length m, the invention is not so limited. The counter may instead be initially set equal to '1' and incremented, rather than decremented, at step 320. In such a case, the test at step 316 would instead determine whether C is less than or equal to m. The result of performing the method with the global counter so initialized, incremented and tested is to cause each broadcasting PE to read the bits of the data word commencing with the $1^{st}$ bit rather than the $m^{th}$ bit. The system user has the added flexibility of initially storing the data word bits in each broadcasting element RAM in an order resulting in a desired sequence of reading therefrom.

While the method of the present invention has been illustrated and described with the shifting of the shift register to the right, the invention is not so limited. As is well known in the art, shift registers may be controlled to shift in either the left or right direction, so that it is only important to the practice of the present invention that the register be consistently shifted in the same direction on each performance of step 312.

While the respective communication buffers of the PEs are directly connectable together in the manner described hereinabove, the invention is not so limited. It is known in the art to also provide parallel processing systems in which element-to-element communication connections can only be made through a routing network. The method of the present invention can be practiced with equal effectiveness on such a system with the required communication buffer-to-communication buffer connections being made at the appropriate steps through the routing network.

While PE 202 of the illustrated embodiment is described as having N, S, E and W ports for communicating with adjacent elements along the two dimensions of system 200, the construction of PE 202 is readily adaptable to systems having more than two dimensions. Thus, in the case of a PE array with greater than two dimensions, each PE 202 could have ports, in addition to N, S, E and W ports, for communicating over additional array dimensions and multiplexers 254,256 could be coupled to these additional ports to enable communication thereby.

While with respect to the two-dimensional array illustrated and described hereinabove a row broadcast operation has been described, it should be apparent to those skilled in the art that the broadcasting of data words from the elements of an array column can be performed in analogous fashion. Further, in view of the construction of a two-dimensional matrix, it is clear that terms such as row and column are relative only and depend on the definitions applied by the system user. In this sense, the description hereinabove of the row broadcast can be viewed as equally applicable to a column broadcast.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. In a parallel processing system comprising a plurality of processing elements (PEs) arrayed in n-dimensions, a method for broadcasting an m-bit data word along a predetermined one of said n dimensions from each of selected ones of said PEs, all said selected PEs broadcasting their respective m-bit data words in a like predetermined direction along said predetermined dimension, said processing system being of the single instruction multiple data type in which each successive instruction is applied to all said PEs in said processing system, each said PE having a communication buffer coupled to serially communicate data bits at least to the communication buffer of the PE adjacent thereto in said predetermined direction along said predetermined dimension, each said PE having a p-bit shift register where p is greater than or equal to m, said processing system including a global counter, each said PE having a sleep flag which when set results in that PE ignoring instructions applied thereto, the communication of data bits between PEs being unaffected by the value of said sleep flag until each sleep flag in each PE is set and until the global counter is of a predetermined value, said method comprising the steps of:

(a) instructing each said PE to set a broadcast flag to a first or a second value respectively in accordance with whether said PE is or is not one of said selected PEs;

(b) instructing each said PE to clear its respective shift register;

(c) instructing each said PE to copy the value of said broadcast flag to said communication buffer, (d) setting a current value C of said global counter to m;

(e) determining whether said sleep flag is set in all said PEs and, if so, proceeding to step (l) and, if not, proceeding to step (f);

(f) instructing each PE not having its sleep flag set to shift its shift register one bit position in a first shifting direction while storing as said sleep flag a last register bit shifted out of said shift register and copying into said shift register as a first register bit the bit stored in said communication buffer;

(g) communicating the bit stored in each said PE communication buffer to the communication buffer of the PE adjacent thereto in said predetermined direction along said predetermined dimension;

(h) determining if said global counter has the value 0 and, if so, returning to step (e) and, if not, proceeding to step (i);

(i) instructing each said PE to store the $C^{th}$ bit of said data word into said communication buffer only if said broadcast flag is set;

(j) decrementing said global counter, (k) returning to step (e); and (l) determining that the m bits stored in said shift register and justified to one end thereof along said first shifting direction constitute said data word.

2. The method of claim 1 wherein less than said plurality of PEs of said processing system have their respective sleep flags in an unset condition prior to the performance of step (a) of said method.

3. The method of claim 1 wherein each said PE includes memory means; and each said m-bit data word being stored in said memory means of the respective selected PE from which the data word is to be broadcast.

4. The method of claim 3, said processing system including means for identifying, after completion of the data word broadcast, the ones of said PEs that participated in the broadcast;

said method including the additional step, following step (l) and performed only by the broadcast participating PEs, of:

transferring said data word, as stored in each said PE shift register, from said shift register to the respective memory means of the same PE.

5. The method of claim 1 wherein said processing system includes logic means for receiving the conditions of the respective sleep flags of all said PEs and determining when all said PE sleep flags are set; and step (e) of said method comprising the substep of proceeding to step (l) if said logic means determines the respective sleep flags of all said PEs are set.

6. The method of claim 1 wherein said global counter is a first global counter, said processing system comprising a second global counter;

step (d) of said method including the substep of setting a current value D of said second counter to 0;

said method including the additional step, following step (g), of incrementing said second global counter; and step (e) of said method comprising the substep of proceeding to step (l) when the value of D is equal to a precomputed value corresponding to the condition that all said PE sleep flags are set.

7. The method of claim 1 wherein the communication buffer in each said PE is directly connectable to the communication buffer of the PE adjacent thereto in said predetermined direction along said predetermined dimension.

8. The method of claim 7 wherein n=2, said PEs being arrayed in rows and columns; and the array of said PEs being wrapped around such that the communication buffer of each PE in a first row is directly connectable to the respective communication buffers of PEs of the same column in a second row and a last row of the array;

so that upon preselecting any row of the array as a broadcasting row and with the remaining rows of said array being nonbroadcasting rows, the steps of said method are effective to broadcast the data word from said broadcasting row to the ones of said PEs participating in the broadcast in the remaining rows of said array.

9. The method of claim 1 wherein n=2, said PEs being arrayed in rows and columns;

said predetermined direction being a first predetermined direction along said columns;

a row of broadcasting PEs being other than a first row of the array of said PEs;

a sequence of nonbroadcasting rows being a first sequence of rows commencing adjacent said broadcasting row in said first predetermined direction along said columns, a second sequence of nonbroadcasting rows commencing adjacent said broadcasting row in a second predetermined direction along said columns opposite said first predetermined direction; and said method comprising the additional steps of performing steps (a)–(l) once for the nonbroadcasting rows in said first predetermined direction and then a second time for the nonbroadcasting rows in said second predetermined direction, so that upon completion of the first and second performance of steps (a)–(l), the data word has been broadcasted to the ones of said PEs that participated in the broadcast in the first and second sequence of rows.

10. The method of claim 1, said processing system further comprising a routing network through which the respective communication buffers of said PEs can be arbitrarily connected.

11. The method of claim 1 wherein n=2; and
said selected PEs constitute a row of PEs broadcasting their respective data words to the PEs in the rows encountered in said predetermined direction.

12. The method of claim 1 wherein n=2; and
said selected PEs constitute a column of PEs broadcasting their respective data words to the PEs in the columns encountered in said predetermined direction.

13. Parallel processing apparatus, comprising:
a plurality of processing elements (PEs), arrayed in n-dimensions, for broadcasting an m-bit data word along a predetermined one of said n dimensions from each of selected ones of said PEs, all said selected PEs broadcasting their respective m-bit data words in a like predetermined direction along said predetermined dimension, said processing apparatus being of the single instruction multiple data type in which each successive instruction is applied to all said PEs in said processing apparatus, each said PE having a communication buffer coupled to serially communicate data bits at least to the communication buffer of the PE adjacent thereto in said predetermined direction along said predetermined dimension, each said PE having a p-bit shift register where p is greater than or equal to m, said processing apparatus including a global counter, each said PE having a sleep flag which when set results in that PE ignoring instructions applied thereto, the communication of data bits between PEs being unaffected by the value of said sleep flag until each sleep flag in each PE$ is set and until the global counter is of a predetermined value, said parallel processing apparatus being programmed to perform the steps of:
(a) instructing each said PE to set a broadcast flag to a first or a second value respectively in accordance with whether said PE is or is not one of said selected PEs;
(b) instructing each said PE to clear its respective shift register;
(c) instructing each said PE to copy the value of said broadcast flag to said communication buffer;
(d) setting a current value C of said global counter to m;
(e) determining whether said sleep flag is set in all said PEs and, if so, proceeding to step l and, if not, proceeding to step (f);
(f) instructing each PE not having its sleep flag set to shift its shift register one bit position in a first shifting direction while storing as said sleep flag a last register bit shifted out of said shift register and copying into said shift register as a first register bit the bit stored in said communication buffer;
(g) communicating the bit stored in each said PE communication buffer to the communication buffer of the PE adjacent thereto in said predetermined direction along said predetermined dimension;
(h) determining if said global counter has the value 0 and, if so, returning to step (e) and, if not, proceeding to step (i)
(i) instructing each said PE to store the $C^{th}$ bit of said data word into said communication buffer only if said broadcast flag is set;
(j) decrementing said global counter;
(k) returning to step (e); and
(l) determining that the m bits stored in said shift register and justified to one end thereof along said first shifting direction constitute said data word.

14. The parallel processing apparatus of claim 13 wherein less than said plurality of PEs of said processing apparatus have their respective sleep flags in an unset condition prior to the performance of step (a).

15. The parallel processing apparatus of claim 13, each said PE including memory means; and
each said m-bit data word being stored in said memory means of the respective selected PE from which the data word is to be broadcast.

16. The parallel processing apparatus of claim 15 including means for identifying, after completion of the data word broadcast, the ones of said PEs that participated in the broadcast;
said parallel processing apparatus being programmed to perform the additional step, following step (l) and performed only by the broadcast participating PEs, of:
transferring said data word, as stored in each said PE shift register, from said shift register to the respective memory means of the same PE.

17. The parallel processing apparatus of claim 13 further including logic means for receiving the conditions of the respective sleep flags of all said PEs and determining when all said PE sleep flags are set; and
step (e) comprising the substep of proceeding to step (l) if said logic means determines the respective sleep flags of all said PEs are set.

18. The parallel processing apparatus claim 13 wherein said global counter is a first global counter;
said parallel processing apparatus comprising a second global counter;
step (d) including the substep of setting a current value D of said second counter to 0;
said parallel processing apparatus being programmed to perform the additional step, following step (g), of incrementing said second global counter; and
step (e) comprising the substep of proceeding to step (l) when the value of D is equal to a precomputed value corresponding to the condition that all said PE sleep flags are set.

19. The parallel processing apparatus claim 13 wherein the communication buffer in each said PE is directly connectable to the communication buffer of the PE adjacent thereto in said predetermined direction along said predetermined dimension.

20. The parallel processing apparatus of claim 19 wherein n=2, said PEs being arrayed in rows and columns; and the array of said PEs being wrapped around such that the communication buffer of each PE in a first row is directly connectable to the respective communication buffers of PEs of the same column in a second row and a last row of the array;

so that upon preselecting any row of the array as a broadcasting row and with the remaining rows of said array being nonbroadcasting rows, the program steps are effective to broadcast the data word from said broadcasting row to the ones of said PEs participating in the broadcast in the remaining rows of said array.

21. The parallel processing apparatus of claim 13 wherein n=2, said PEs being arrayed in rows and columns;

said predetermined direction being a first predetermined direction along said columns;

a row of broadcasting PEs being other than a first row of the array of said PEs;

a sequence of nonbroadcasting rows being a first sequence of rows commencing adjacent said broadcasting row in said first predetermined direction along said columns, a second sequence of nonbroadcasting rows commencing adjacent said broadcasting row in a second predetermined direction along said columns and opposite said first predetermined direction; and said program steps comprising the additional steps of performing steps (a)–(l) once for the nonbroadcasting rows in said first predetermined direction and then a second time for the nonbroadcasting rows in said second predetermined direction, so that upon completion of the first and second performances of steps (a)–(l), the data word has been broadcasted to the ones of said PEs that participated in the broadcast in the first and second sequence of rows.

22. The parallel processing apparatus of claim 13 further comprising a routing network through which the respective communication buffers of said PEs can be arbitrarily connected.

23. The parallel processing apparatus of claim 13 wherein n=2; and said selected PEs constitute a row of PEs broadcasting their respective data words to the PEs in the rows encountered in said predetermined direction.

24. The parallel processing apparatus claim of 13 wherein n=2; and said selected PEs constitute a column of PEs broadcasting their respective data words to the PEs in the columns encountered in said predetermined direction.

25. In a parallel processing system comprising a plurality of processing elements (PEs) arrayed in n-dimensions, a method for broadcasting an m-bit data word along a predetermined one of said n dimensions from each of selected ones of said PEs, all said selected PEs broadcasting their respective m-bit data words in a like predetermined direction along said predetermined dimension, said processing system being of the single instruction multiple data type in which each successive instruction is applied to all said PEs in said processing system, each said PE having a communication buffer coupled to serially communicate data bits at least to the communication buffer of the PE adjacent thereto in said predetermined direction along said predetermined dimension, each said PE having a p-bit shift register where p is greater than or equal to m, said processing system including a global counter, each said PE having a sleep flag which when set results in that PE ignoring instructions applied thereto, the communication of data bits between PEs being unaffected by the value of said sleep flag until each sleep flag in each PE is set and until the global counter is of a predetermined value, said method comprising the steps of:

(a) instructing each said PE to set a broadcast flag to a first or a second value respectively in accordance with whether said PE is or is not one of said selected PEs;

(b) instructing each said PE to clear its respective shift register;

(c) instructing each said PE to copy the value of said broadcast flag to said communication buffer;

(d) setting a current value C of said global counter to 1;

(e) determining whether said sleep flag is set in all said PEs and, if so, proceeding to step (l) and, if not, proceeding to step (f);

(f) instructing each PE not having its sleep flag set to shift its shift register one bit position in a first shifting direction while storing as said sleep flag a last register bit shifted out of said shift register and copying into said shift register as a first register bit the bit stored in said communication buffer;

(g) communicating the bit stored in each said PE communication buffer to the communication buffer of the PE adjacent thereto in said predetermined direction along said predetermined dimension;

(h) determining if said global counter has the value m and, if so, returning to step (e) and, if not, proceeding to step (i);

(i) instructing each said PE to store the $C^{th}$ bit of said data word into said communication buffer only if said broadcast flag is set;

(j) incrementing said global counter;

(k) returning to step (e); and (l) determining that the m bits stored in said shift register and justified to one end thereof along said first shifting direction constitute said data word.

26. Parallel processing apparatus, comprising:

a plurality of processing elements (PEs), arrayed in n-dimensions, for broadcasting an m-bit data word along a predetermined one of said n dimensions from each of selected ones of said PEs, all said selected PEs broadcasting their respective m-bit data words in a like predetermined direction along said predetermined dimension, said processing apparatus being of the single instruction multiple data type in which each successive instruction is applied to all said PEs in said processing apparatus, each said PE having a communication buffer coupled to serially communicate data bits at least to the communication buffer of the PE adjacent thereto in said predetermined direction along said predetermined dimension, each said PE having a p-bit shift register where p is greater than or equal to m, said processing apparatus including a global counter, each said PE having a sleep flag which when set results in that PE ignoring instructions applied thereto, the communication of data bits between PEs being unaffected by the value of said sleep flag until each sleep flag in each PE is set and until the global counter is of a predetermined value, said parallel processing apparatus being programmed to perform the steps of:

(a) instructing each said PE to set a broadcast flag to a first or a second value respectively in accordance with whether said PE is or is not one of said selected PEs;

(b) instructing each said PE to clear its respective shift register;

(c) instructing each said PE to copy the value of said broadcast flag to said communication buffer;

(d) setting a current value C of said global counter to 1;

(e) determining whether said sleep flag is set in all said PEs and, if so, proceeding to step (l) and, if not, proceeding to step (f);

(f) instructing each PE not having its sleep flag set to shift its shift register one bit position in a first shifting direction while storing as said sleep flag a last register bit shifted out of said shift register and copying into said shift register as a first register bit the bit stored in said communication buffer;

(g) communicating the bit stored in each said PE communication buffer to the communication buffer of the PE adjacent thereto in said predetermined direction along said predetermined dimension;

(h) determining if said global counter has the value m and, if so, returning to step (e) and, if not, proceeding to step (i)

(i) instructing each said PE to store the $C^{th}$ bit of said data word into said communication buffer only if said broadcast flag is set;

(j) incrementing said global counter;

(k) returning to step (e); and (l) determining that the m bits stored in said shift register and justified to one end thereof along said first shifting direction constitute said data word.

* * * * *